United States Patent [19]

Takahashi

[11] Patent Number: 5,793,487
[45] Date of Patent: Aug. 11, 1998

[54] OPTICAL INTERFERENCE SYSTEM FOR PERFORMING INTERFERENCE MEASUREMENT USING WAVELENGTH

[75] Inventor: Kazuo Takahashi, Kawasaki, Japan

[73] Assignee: Canon Kabushiki Kaisha, Tokyo, Japan

[21] Appl. No.: 935,905

[22] Filed: Sep. 23, 1997

Related U.S. Application Data

[63] Continuation of Ser. No. 509,938, Aug. 1, 1995, abandoned.

[30] Foreign Application Priority Data

Aug. 2, 1994 [JP] Japan ................................. 6-200092

[51] Int. Cl.[6] ........................................... G01B 9/02
[52] U.S. Cl. ........................ 356/349; 356/358; 356/361
[58] Field of Search ............................ 356/358, 349, 356/361

[56] References Cited

U.S. PATENT DOCUMENTS 5,404,222   4/1995   Lis ........................................... 356/358

OTHER PUBLICATIONS

Akira Ishida, "Two–Wavelength Displacement–Measuring Interferometer Using Second–Harmonic Light to Eliminate Air–Turbulence–Induced Errors", Japanese Journal of Applied Physics, vol. 28, No.3, pp. L473–L475 (Mar., 1989).

*Primary Examiner*—Frank G. Font
*Assistant Examiner*—Amanda Merlino
*Attorney, Agent, or Firm*—Fitzpatrick, Cella, Harper & Scinto

[57] ABSTRACT

An optical interference system includes a light source for emitting light whose wavelength can be changed, and a measuring system for changing the wavelength of the light from the light source and for performing interference measurement processes corresponding to the provided wavelengths.

15 Claims, 5 Drawing Sheets

OPTICAL INTERFERENCE SYSTEM FOR PERFORMING INTERFERENCE MEASUREMENT USING WAVELENGTH

This application is a continuation of application No. 08/509,938, filed Aug. 1, 1995, now abandoned.

FIELD OF THE INVENTION AND RELATED ART

This invention relates generally to an optical interference system and, more particularly, to an optical interference distance measuring system which is suitably usable in a movement stage, for example, and which is arranged to correct a measurement error due to a change in index (refractive index) of an air between an article to be measured and a laser interferometer for detecting distance information from the interferometer to the article, to thereby produce high precision distance information.

There have been proposed many types of interference distance measuring systems for obtaining, through an interferometer, distance information such as distance measurement or size measurement. When the precision of measurement to be done to the distance or size comes to an order of nanometer (nm), from an order of micrometer (μm), a change in index (refractive index) of an air between the interferometer and an article to be measured becomes influential to the measured value. As for the factors which cause such change in index of the air, there are temperature, pressure and humidity, for example.

There have been proposed methods for removing the effect of these factors to assure accurate distance information. In a first example, the factors such as described above are measured by using respective sensors, and a change in index of the air is calculated from the detected values in accordance with a conversion formula, to thereby reduce the measurement error. As regards such conversion formula, generally a formula such as equation (1) below is used.

$$[\{(n_s/n) - 1\} \times 10^{-6}] = \{0.931 + 0.006(S^2 - 3) - 0.003(t - 20)\}(t - 20) - \{0.359 + 0.002(S^2 - 3) - 0.001(t - 20)\}(p - 760) + 0.050(f - 10) - 0.015(k - 3) \quad (1)$$

wherein $n_s$: refractive index of an air in a standard state;

p: atmospheric pressure (mmHg) at the time of measurement;

n: refractive index of an air at the time of measurement;

f: water vapor pressure at the time of measurement;

s: number of waves in 1 μm;

k: content of carbon dioxide gas at the time of measurement (unit of 0.01%); and t: temperature at the time of measurement.

The correction system such as described above is called an auto-compensator and it is commercially available.

In a second example, the ambience temperature in which a laser interferometer is used is stabilized and, additionally, the relative humidity is stabilized, to thereby reduce the change in index of the air. In a modified form, only a change in pressure is measured. The measured value is substituted into the above-described equation, and a correction coefficient is calculated to correct the measurement.

Figure 7:
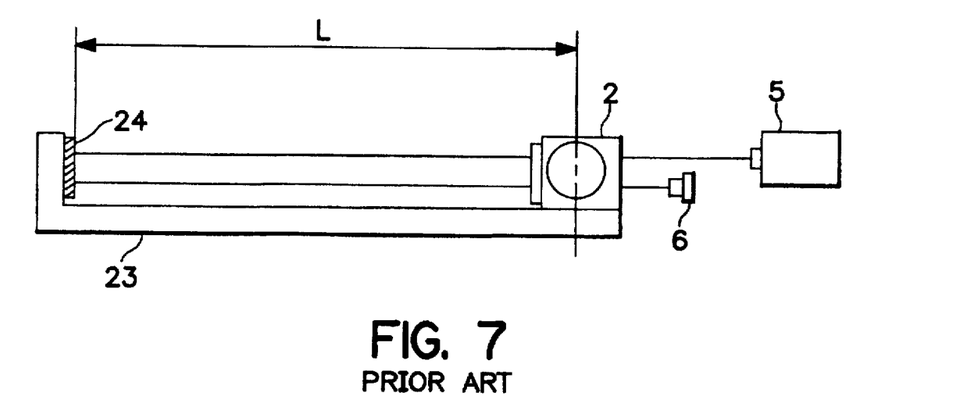
FIG. 7 is a schematic view of a known type laser interference distance measuring system.

In a third example of such correction system, as shown in FIG. 7, by using a material 23 of low thermal expansion coefficient, a mechanism capable to retaining a constant measurement distance L is prepared. This distance is measured by a laser interferometer which comprises a laser light source 5, a laser interference optical system 2, a reflection mirror 24 and a photoelectric converting element (receiver) 6. If the emission wavelength of the laser light source 5 is stable, a change as measured corresponds to the measurement error due to a change in index of the air.

The third method is superior in the point that it is able to detect a change in index directly, rather than detecting the above-described factors separately. There are commercially available systems based on this method, and they are called "wavelength tracker" or "optical wavelength compensator".

In the first method described above, the precision of each sensor affects the correction. To the distance to be measured, 1-2 ppm is the limit of precision correctable. In the second method, stabilization of temperature or humidity has a limit. Particularly, in general industrial systems in which a heat source is placed close, it is very difficult to stabilize the temperature over the entire range of air through which measuring laser light passes.

In the third method, the size of the system is large. It is not easily placed in proximity to the measuring laser beam. Particularly, in an example such as an X-Y stage having many measurement axes, each axis has to be provided with a correction system. Also, there are problems in respect to cost of the system and to a laser power (large power is necessary because it has to be divided).

There is a recently proposed method ("Japanese Journal of Applied Physics", vol. 28, no. 3, pages L473–L475 (1989)) in which a change in index of air is measured, for correction, by using a light source which produces laser light having two different frequencies. However, this method uses an Ar laser which has poor wavelength stability and shorter laser lifetime as compared with those of a He-Ne laser. Also, it uses a system which provides two wavelengths of 488 nm and harmonic 244 nm. Thus, the optical arrangement has to be complex. For the measurement of a reference size, it is a requisition that the emission wavelength of the laser light source is stable. When an Ar laser is used, the instability of the Ar laser itself provides a bar to enhancement of precision.

SUMMARY OF THE INVENTION

It is accordingly an object of the present invention to provide an interference system which is compact and inexpensive and which enables high precision measurement by correcting a measurement error due to a change in index (refractive index), from a normal state, of an air between the interferometer and an article to be measured.

It is another object of the present invention to provide a movement stage system to which an interference system as described above is applied.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

[Embodiment 1]

Figure 1:
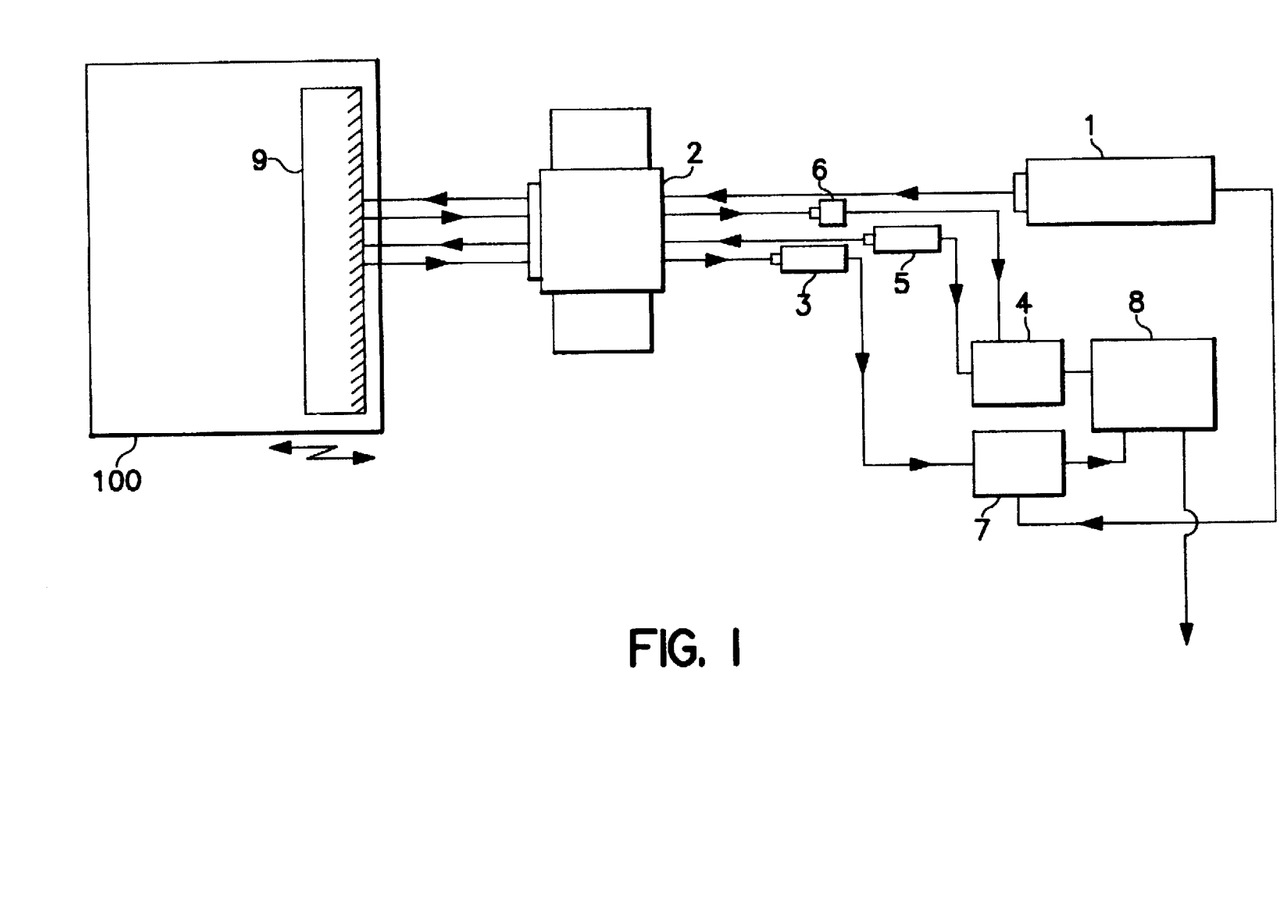
FIG. 1 is a schematic view of a main portion of a first embodiment of the present invention.

FIG. 1 shows a main portion of a first embodiment of the present invention, in which the invention is applied to an optical heterodyne interferometer. Denoted in FIG. 1 at 1 is a laser light source (laser head) which provides first light source means. In the laser light source, laser light from a tube of a thermally stabilized He-Ne laser is influenced by Zeeman effect or by means of an acousto-optic device (AOM) to provide laser light of two orthogonal frequencies. Denoted at 2 is a laser interference optical system (interferometer or laser interferometer), which serves to separate, on the basis of optical heterodyne interference, the laser light of orthogonal two frequencies from the laser light source 1, into a measuring light and a reference light. The measuring light is projected to a measurement mirror 9 which is provided on a movement stage 100 (the mirror being an article to be measured), and light (measuring light) reflected thereby is caused to interfere with the reference light.

Denoted at 3 is a receiver for photoelectrically converting a darkness/brightness signal of interference light from the laser interferometer 2, into an electric signal (interference signal). Denoted at 7 is a first operation circuit for performing signal processing by using an electric signal from the receiver 3 and a reference signal from the laser head 1, to calculate distance information related to the article 9 to be measured. Denoted at 8 is a control circuit having an interface circuit for applying the distance information from the first operation circuit 7 to an outside device and for receiving a signal, such as a measurement timing signal from the outside device.

In this embodiment, the elements 1, 2, 3, 7 and 8 described above are components of a first interference distance measuring system which is based on optical heterodyne interference method.

Denoted at 5 is a laser light source (laser head) having variable emission wavelength, and it provides second light source means. In this laser light source, laser light from a solid laser is transformed, through an acousto-optic device, into laser light having two orthogonal and different frequencies. The laser light from the laser light source 5 is directed to the laser interferometer 2, close along the path of the laser interferometer. In a similar manner as the first interference distance measuring system, the laser interferometer 2 provides interference light.

Denoted at 6 is a receiver for photoelectrically converting a darkness/brightness signal of interference light from the laser light source 5, into an electric signal (interference signal). Denoted at 4 is a second operation circuit for performing signal processing by using an electric signal from the receiver 6 and a reference signal from the laser head 5, to calculate distance information related to the article 9 to be measured. The distance information from the operation circuit 4 is applied to the control circuit 8.

In this embodiment, the elements 2, 5, 6, 4 and 8 described above are components of a second interference distance measuring system which is based on optical heterodyne interference method.

As will be described below, the present embodiment comprises a system in which measurement light, called plane mirror interferometer, is reciprocated twice to thereby enhance the resolution. However, it is not necessary that the system is based on a plane mirror interferometer.

Figure 2A:
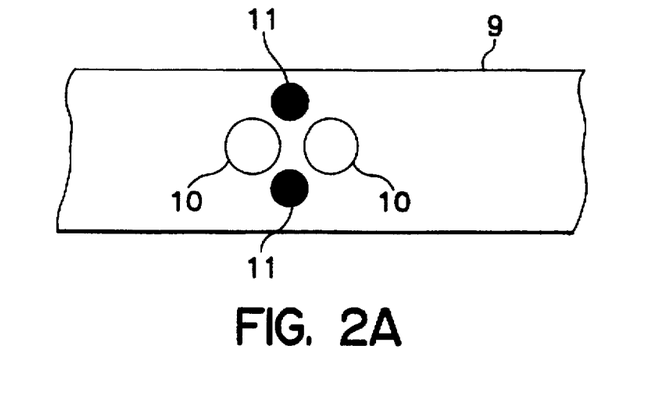
FIGS. 2A and 2B are enlarged views, respectively, of a portion of FIG. 1.

FIG. 2A shows the state in which laser light 10 from the laser light source 1 of the first interference distance measuring system and laser light 11 from the laser source 5 of the second interference distance measuring system, being a system having a plane mirror interferometer, are projected on the surface of the measurement mirror 9 of the movement stage.

Figure 2B:
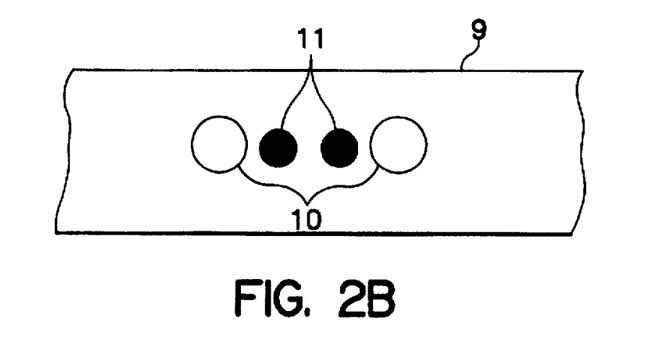

FIG. 2B shows the laser lights 10 and 11 upon the measurement mirror 9 in a case where the first and second interference distance measuring systems are disposed along a plane, such as shown in FIG. 1.

The operation of the interference distance measuring system of this embodiment will now be described.

Figure 3:
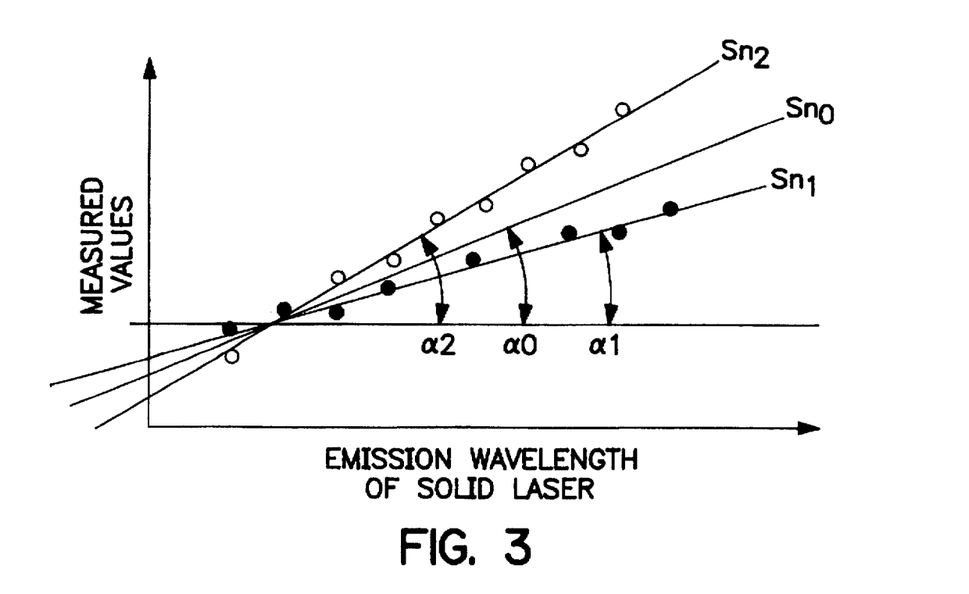
FIG. 3 is a graph for explaining the relationship between the emission wavelength from a laser light source and produced distance information.

A signal from an outside control system is applied to the control circuit 8, and the first and second interference distance measuring system are reset. The measurement thus starts. The position of the mirror 9 at this moment defines an origin. Then, the mirror 9 is moved close to the laser interferometer 2, to make the dead path minimum, and the position is fixed. At this position, the emission frequency of the solid laser of the laser light source 5 of the second interference distance measuring system is changed sequentially, little by little, or it is steeped, and continuously the interference signals at respective frequencies are photoelectrically converted by the receiver 6 and, by the operation circuit 4, they are converted into the amount of change in position. Memory means of the control circuit 8 memorizes the amounts of change in position in relation to the respective frequencies. Generally, the emission frequencies of a solid laser and the measured values (amounts of change in position) at respective frequencies are in a proportional relation such as shown in FIG. 3. Thus, straight approximation is done to the results in accordance with the least square method, for example, and the inclination $\alpha_0$ of the straight line is detected.

The reason for obtaining a measured value by using plural frequencies is for enhancement of the measurement precision. As compared with a case where the tilt of the straight line is detected on the basis of two wavelengths only, it assures a larger enhancement of the measurement precision.

In the measurement process described above, the dead path is made minimum. Thus, it can be considered that, in a temperature controlled environment, a change in refractive index is not easily caused by fluctuation of an air, for example. Therefore, once the atmospheric pressure is measured by a separate sensor, the refractive index of the air at the temperature and pressure at this moment can be calculated in accordance with equation (1). It is now assumed that the index is $n_0$. Alternatively, a straight line $Sn_0$ of FIG. 3 may be defined by using equation (1) and a refractive index $n_0$ at the standard state. Any of these methods may be adopted, and a straight line $Sn_0$ at a refractive index $n_0$, which provides a reference for the measurement, is determined.

After this, the mirror 9 is moved to a position most remote from the laser interferometer 2, and the mirror position is fixed. At this position, measurement similar to that described above is performed. By executing calculation, a straight line $Sn_1$ or a straight line $Sn_2$ of FIG. 3 is defined, and the tilt $\alpha_1$ or $\alpha_2$ of the straight line is determined. The difference in inclination between the straight line $Sn_0$ at the refractive index $n_0$ and the straight line $Sn_1$ or $Sn_2$ at the refractive index $n_1$ or $n_2$, can be considered as corresponding to the measurement error due to fluctuation of the air as the dead path is made larger.

In the embodiment described above, a measurement error is detected while the mirror 9 is held fixed. However, since the actual position is measured by using the first interference distance measuring system, if the measured actual position is subtracted from the position measured values at respective frequencies, described above, to determine the amount of change in position, then it is not always necessary to keep the mirror 9 stationary.

For the second interference distance measuring system, it is sufficient that the frequency of the laser is stable only in a very short period in which measurement of a change in index (refractive index) of the air is executed. If the function of measuring the emission frequency is added, it is not always necessary that the absolute value of the emission frequency is constant.

[Embodiment 2]

Figure 4:
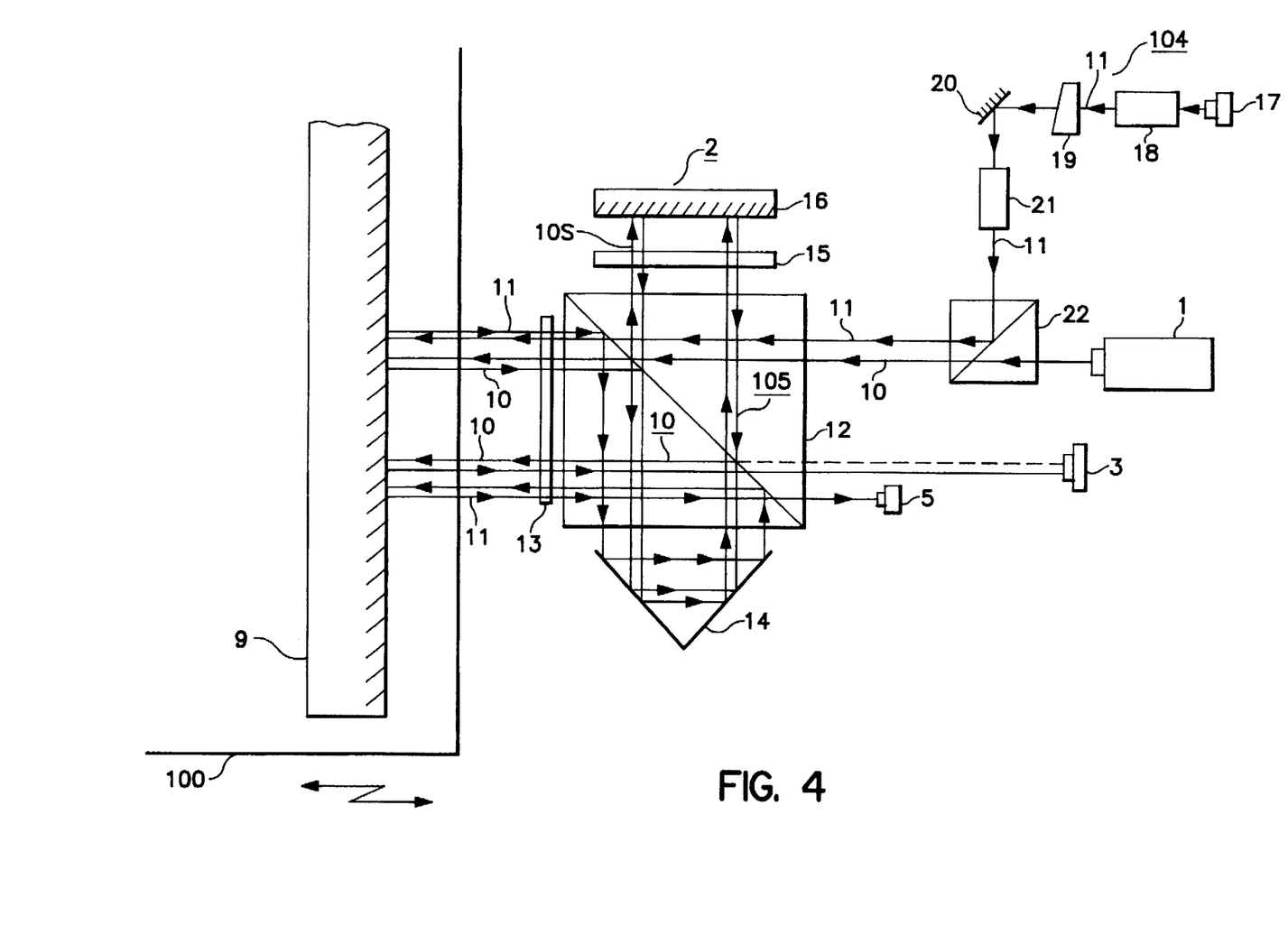
FIG. 4 is a schematic view of a main portion of a second embodiment of the present invention.

FIG. 4 shows a main portion of a second embodiment of the present invention. Denoted in the drawing at 1 is a laser light source (laser head) which provides first light source means. In the laser light source, laser light from a tube of a thermally stabilized He-Ne laser is influenced by Zeeman effect or by means of an acousto-optic device (AOM) to provide laser light of two orthogonal frequencies. Denoted at 2 is an interferometer.

Laser light emitted by the laser light source 1 goes via an optical member 22 such as a half mirror, for example, and is bisected by a polarization beam splitter 12 into two light beams. Here, one of the two orthogonal frequencies goes straight, as a measuring laser light 10, through the polarization beam splitter 12, and then it passes a quarter wave plate 13 and impinges on a measurement mirror 9 provided on a movement stage 100. The laser light 10 as reflected by the mirror 9 passes the quarter wave plate 13 again and returns to the polarization beam splitter 12. Here, since the state of polarization of the laser light 10 has been changed from twice passing through the quarter wave plate 13, the light is reflected by the polarization beam splitter 12. The light is then reflected by a corner cube prism 14 and again it returns back to the polarization beam splitter 12. Here, it is reflected thereby again and passes the quarter wave plate 13, and then it is projected on the measurement mirror 9. The measuring laser light 10 is reflected (second time reflection) by the measurement mirror 9, and it passes the quarter wave plate 13 and goes back to the polarization beam splitter 12.

On the other hand, of the laser light from the laser light source 1, the other laser beam denoted by broken lines (reference laser light 10S) as reflectively deflected by the polarization beam splitter 12, passes a quarter wave plate 15. It is then reflected by a reflection mirror 16 and is projected again on the quarter wave plate 15, whereby the state of polarization is changed and, thus, the light now passes the polarization beam splitter 12. It is then reflected by a corner cube prism 14 and passes again the polarization beam splitter 12 and the quarter wave plate 15. Then, the light is reflected by the reflection mirror 16 and then passes the quarter waver plate 15 again, and it is projected on the polarization beam splitter 12.

The reference laser light 10S and the measuring laser light 10, both impinging on the polarization beam splitter 12, interfere with each other to produce a darkness/brightness signal which is then received by a photoelectric converting element 3. The described is a general light path of a plane mirror interferometer of measurement heterodyne method.

In this embodiment, the laser light from the heterodyne interference system which includes a laser light source (second light source means) may be directly projected in the vicinity of the light path of the first measurement plane mirror interferometer system, such as shown in FIG. 1. Alternatively, an additional optical system 104 such as shown in FIG. 4 may be inserted, such that the laser light from the second interference distance measuring system including the second laser light source may be projected in the vicinity of the light path of the first measurement plane mirror interferometer system.

Namely, the laser light 11 from the laser light source 17 which provides a second light source means, being able to change the emission wavelength, may be transformed by an acousto-optic device 18, into orthogonal two difference frequencies, and by means of a prism 19, a reflection mirror 20, a collimator lens 21 and an additional optical system 22, it may be projected on a polarization beam splitter 12 of a measurement plane mirror interferometer.

The additional laser light 11 which impinges on the measurement plane mirror interferometer and whose emission wavelength is capable of being changed, also goes along a light path similar to that of the first measurement laser light as described, and a resultant interference signal is received by the photoelectric converting element 5.

[Embodiment 3]

Figure 5:
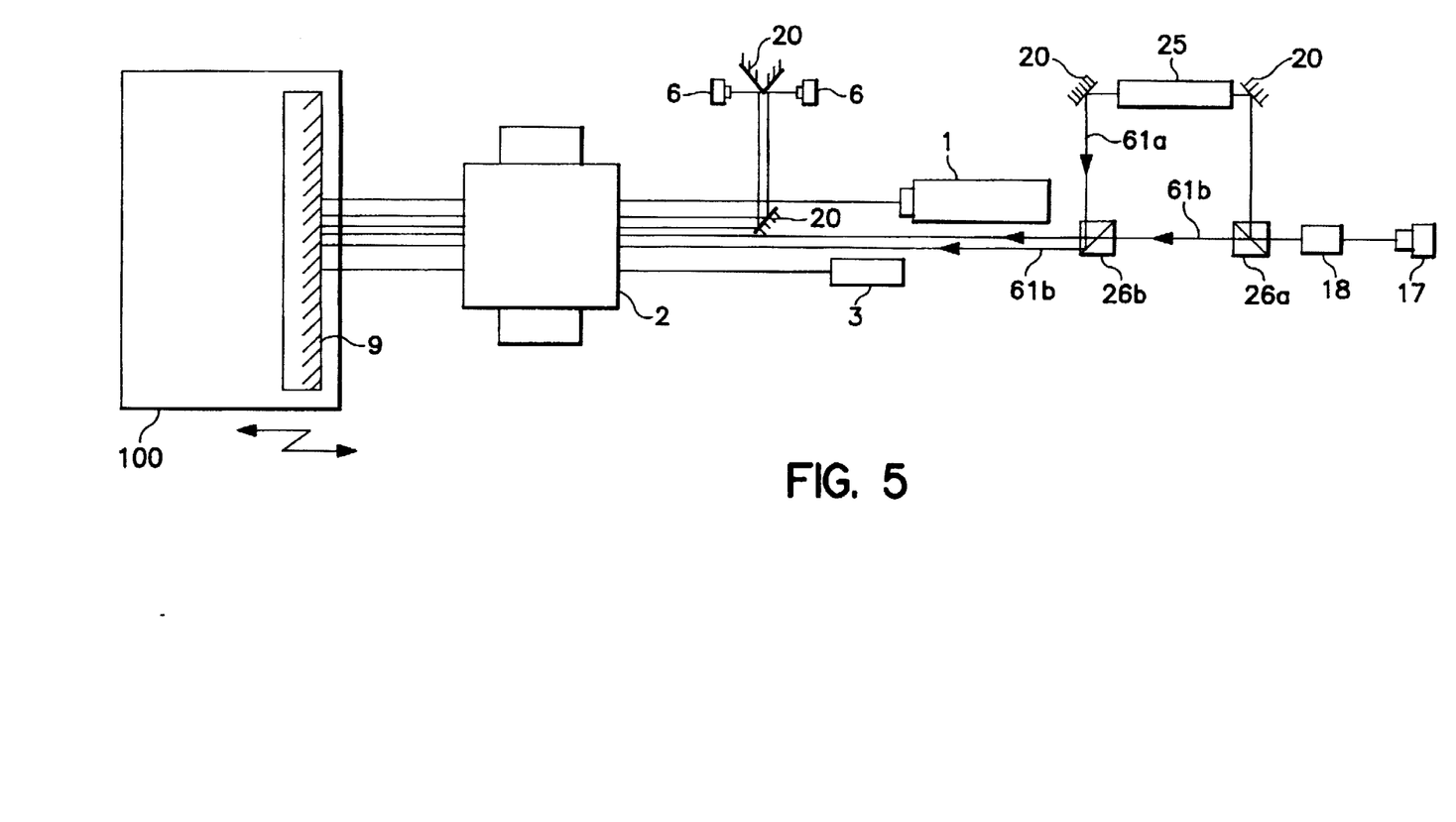
FIG. 5 is a schematic view of a main portion of a third embodiment of the present invention.

FIG. 5 shows a main portion of a third embodiment of the present invention. In this embodiment, in place of a solid laser of variable emission wavelength, a laser light source 17 of constant emission wavelength is uses as the second light source means. Laser light from the laser light source 17 is transformed by an acousto-optic device 18 into laser light of orthogonal two different frequencies. By means of a beam splitter 16a, one of the laser lights is directed to a wavelength shifter 25 for shifting the wavelength of light.

After this, the two laser lights 61a and 61b are recombined by a beam splitter 26b. The remaining portion of this embodiment has substantially the same structure as of the first embodiment of FIG. 1.

[Embodiment 4]

Figure 6:
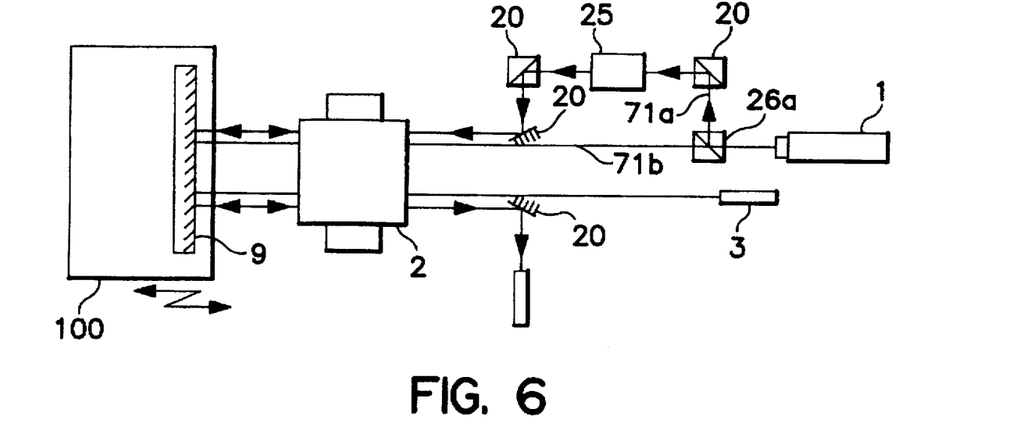
FIG. 6 is a schematic view of a main portion of a fourth embodiment of the present invention.

FIG. 6 shows a fourth embodiment of the present invention, wherein laser light from a He-Ne laser 1 (laser light source) which provides second light source means, is bisected by a beam splitter 26a into two laser beams. One laser light 71a of the split laser lights is directed via a mirror 20 to a wavelength shifter 25. By means of reflection mirrors 20b and 20, the light if projected on a laser interferometer 2. The other laser light 71b is directly projected on the laser interferometer 2.

With the arrangement of the present embodiment as described, laser lights of two orthogonal frequencies are inputted into the laser interferometer 2. The remaining portion of this embodiment has substantially the same structure as that of the first embodiment of FIG. 1.

In accordance with the embodiments of the present invention described hereinbefore, the interference system may include light source means whose emission wavelength is changeable relative to a first interference distance measuring system. A portion of the optical arrangement of the first interference distance measuring system may be used in common as a component of the second interference distance measuring system. The second interference distance measuring system may have optical components partly or totally used in common as the optical components of the first interference system. When the refractive index of an air between the interferometer and an article to be measured changes from a standard state, a measurement error resulting from the change can be corrected on the basis of plural pieces of distance information obtained by sequentially changing the wavelength by the second interference distance measuring system. Thus, an interference distance measuring system capable of detecting precise distance information is assured.

Particularly, in the above-described embodiments, a portion of the optical components related to measurement, such as the element 2, for example, is used in common in both of the first and second interference distance measuring systems. This assures reduction of error to thermal deformation itself of an optical component, for example. Additionally, the cost is lowered.

While the invention has been described with reference to the structures disclosed herein, it is not confined to the details set forth and this application is intended to cover such modifications or changes as may come within the purposes of the improvements or the scope of the following claims.

What is claimed is:

1. An optical interference system, comprising:

light source means for emitting light whose wavelength is able to be changed; and measuring means for directing the light from said light source means to an interferometer, whereby interference light is formed, and for receiving the interference light and performing interference measurement, said measuring means sequentially changing the wavelength of light from said light source means and producing interference measurement data at respective wavelengths, wherein environmental change information at the interferometer is obtainable based on the interference measurement data with respect to the different wavelengths.

2. A system according to claim 1, wherein said measuring means serves to perform measurement of positional information of an object, on the basis of interference measurement.

3. A system according to claim 1, wherein said measuring means serves to perform measurement while compensating a change in refractive index of a gas on a light path.

4. A system according to claim 1, wherein said light source means includes a solid laser source.

5. A system according to claim 1, wherein said light source means includes a wavelength shifter.

6. A system according to claim 1, wherein said light source means includes an acousto-optic device.

7. A system according to claim 1, wherein the interference is based on heterodyne interference.

8. An optical interference system, comprising:

a first component system for directing light from a first light source of fixed wavelength, whereby interference light is formed, and for receiving the interference light and performing interference measurement; and a second component system having a second light source of variable wavelength, said second component system directing light from said second light source to an optical system having an optical element which functions also as at least a portion of said interferometer, whereby interference light is formed, and said second component system receiving the interference light and performing interference measurement, said second component system sequentially changing the wavelength of light from said second light source and producing interference measurement data at respective wavelengths, wherein environmental change information at the interferometer is obtainable based on the interference measurement data with respect to the different wavelengths.

9. A system according to claim 8, wherein said second light source includes a solid laser source.

10. A system according to claim 8, further comprising means for measuring the wavelength of light from said second light source.

11. A stage device, comprising:

a movable stage; and an optical interference system for detecting positional information related to said movable stage; and an environmental change detecting system comprising a light source of variable wavelength, said environmental change detecting system directing light from said light source to an optical system having an optical element which functions also as at least a portion of said optical interference system, whereby interference light is formed, and said environmental change detecting system receiving the interference light and performing interference measurement, said environmental change detecting system sequentially changing the wavelength of light from said light source and producing interference measurement data at respective wavelengths, wherein environmental change information at said optical interference system is obtainable based on the interference measurement data with respect to the different wavelengths.

12. An apparatus according to claim 11, wherein said light source comprises a solid laser.

13. An apparatus according to claim 11, wherein said environmental change detecting system produces interference measurement data with respect to the different wavelengths of light from said light source, at respective moments whereat said stage is at different positions.

14. An apparatus according to claim 13, said environmental change detecting system producing first interference measurement data with respect to the different wavelengths of light from said light source as said stage is at a first position, said environmental change detecting system producing second interference measurement data with respect to the different wavelengths of light from said light source as said stage is at a second position different from the first position, and the environmental change information of said optical system is produced based on a comparison between: (i) a change in the first interference measurement data at the first position, with a change in wavelength of the light; and (ii) a change in the second interference measurement data at the second position, with a change in wavelength of the light.

15. An apparatus according to claim 14, wherein said environmental change detecting system produces air refractivity information, in relation to the environmental change information.

* * * * *

UNITED STATES PATENT AND TRADEMARK OFFICE
CERTIFICATE OF CORRECTION

PATENT NO. : 5,793,487
DATED : August 11, 1998
INVENTOR(S) : Takahashi

It is certified that error appears in the above-identified patent and that said Letters Patent is hereby corrected as shown below:

COLUMN 4:

Line 23, "system" should read --systems--.

COLUMN 6:

Line 30, "uses" should read --used--.

COLUMN 8:

Line 14, "and" should be deleted.

Signed and Sealed this

Eighteenth Day of May, 1999

Attest:

Q. TODD DICKINSON

*Attesting Officer*     Acting Commissioner of Patents and Trademarks